United States Patent
Yang et al.

(10) Patent No.: US 12,294,304 B2
(45) Date of Patent: May 6, 2025

(54) BUCK-BOOST SWITCHING REGULATOR CAPABLE OF DAMPING OUT THE RINGING AND CONTROL METHOD THEREOF

(71) Applicant: Richtek Technology Corporation, Zhubei (TW)

(72) Inventors: Shei-Chie Yang, Taichung (TW); Yuan-Yen Mai, Taipei (TW); Pao-Hsun Yu, Hsinchu (TW); Cheng-Hung Hsu, Changhua (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 268 days.

(21) Appl. No.: 18/146,493

(22) Filed: Dec. 27, 2022

(65) Prior Publication Data

US 2023/0216410 A1 Jul. 6, 2023

Related U.S. Application Data

(63) Continuation-in-part of application No. 17/566,678, filed on Dec. 30, 2021, now Pat. No. 11,736,013.

(60) Provisional application No. 63/298,679, filed on Jan. 12, 2022.

(30) Foreign Application Priority Data

Jun. 14, 2022 (TW) .................. 111121941

(51) Int. Cl.
*H02M 3/158* (2006.01)
*H02M 1/00* (2006.01)

(52) U.S. Cl.
CPC ....... *H02M 3/1582* (2013.01); *H02M 1/0054* (2021.05)

(58) Field of Classification Search
CPC .................................................. H02M 3/1582
See application file for complete search history.

(56) References Cited

U.S. PATENT DOCUMENTS

| | | | |
|---|---|---|---|
| 9,178,420 B1* | 11/2015 | Hawley | H02M 3/158 |
| 2006/0006850 A1* | 1/2006 | Inoue | H02J 7/007182 |
| | | | 323/265 |
| 2019/0131877 A1* | 5/2019 | Luff | H02M 3/1582 |
| 2020/0129686 A1* | 4/2020 | Khawar | A61M 1/1601 |
| 2021/0129686 A1* | 5/2021 | Hao | H02M 7/53871 |
| 2024/0250613 A1* | 7/2024 | McCue | H02M 1/32 |

* cited by examiner

*Primary Examiner* — Peter M Novak
(74) *Attorney, Agent, or Firm* — Tung & Associates

(57) ABSTRACT

A buck-boost switching regulator includes: a power switch circuit including an input switch unit and an output switch unit; a bypass control circuit configured to operably generate a bypass control signal according to a conversion voltage difference between an input voltage of an input power and an output voltage of an output power and according to whether an inductor current flowing through an inductor reaches an output current of the output power; and a bypass switch circuit, wherein when the conversion voltage difference is below a reference voltage and when the inductor current flowing through the inductor reaches the output current, the bypass control signal controls the bypass switch circuit to electrically connect the input power with the output power, so that the buck-boost switching regulator operates in a bypass mode.

26 Claims, 11 Drawing Sheets

| VTC | VthU | VthL |
|---|---|---|
| VOUT_S – VIN_S | Vref1 | Vref2 |
| VOUT_S | VIN_S + Vref1 | VIN_S – Vref2 |
| VIN_S | VOUT_S + Vref2 | VOUT_S – Vref1 |

Fig. 3B

BUCK-BOOST SWITCHING REGULATOR CAPABLE OF DAMPING OUT THE RINGING AND CONTROL METHOD THEREOF

CROSS REFERENCE

The present invention is a continuation-in-part application of U.S. Ser. No. 17/566,678, filed on Dec. 30, 2021, and the present invention claims priority to U.S. 63/298,679 filed on Jan. 12, 2022 and claims priority to TW 111121941 filed on Jun. 14, 2022.

BACKGROUND OF THE INVENTION

Field of Invention

The present invention relates to a buck-boost switching regulator, and more particularly, to a buck-boost switching regulator having a bypass mode and capable of reducing ringing. The present invention also relates to a control method of a buck-boost switching regulator.

Description of Related Art

Please refer to FIG. 1, which shows a conventional buck-boost switching regulator. The conventional buck-boost switching regulator enters the bypass mode when the input voltage is greater than or equal to a first threshold and exits the bypass mode when the output voltage is greater than or equal to a second threshold. As shown in FIG. 1, when the conventional buck-boost switching regulator switches from the buck-boost mode to the bypass mode, the variation of the inductor current is very large, resulting in ringing of the output voltage. The excessive ringing amplitude not only stresses the components but also causes the buck-boost switching regulator to erroneously leave the bypass mode at the second threshold. Although increasing the second threshold to the third threshold can solve this issue of false exiting, the power conversion efficiency of the system will become worse.

In view of the above, the present invention addresses the shortcoming of the conventional art, and proposes a buck-boost switching regulator that can reduce switching loss and reduce ringing in a bypass mode when the input voltage is similar to the output voltage.

SUMMARY OF THE INVENTION

From one perspective, the present invention provides a buck-boost switching regulator configured to convert an input power into an output power, including: a power switch circuit, comprising an input switch unit and an output switch unit, wherein the input switch unit is configured to alternatingly connect a first end of an inductor to the input power or a ground potential, and the output switch unit is configured to alternatingly connect a second end of the inductor to the output power or the ground potential, so as to convert the input power into the output power; a bypass control circuit, configured to generate a bypass control signal according to a conversion voltage difference between an input voltage of the input power and an output voltage of the output power and according to whether an inductor current flowing through the inductor reaches an output current of the output power; and a bypass switching circuit, wherein when the conversion voltage difference is less than a reference voltage and the inductor current flowing through the inductor reaches the output current, the bypass control signal controls the bypass switching circuit to electrically connect the input power to the output power, so that the buck-boost switching regulator operates in a bypass mode.

In one embodiment, when the buck-boost switching regulator operates in a buck mode, wherein an output high-side switch of the output switch unit is turned on, and an output low-side switch of the output switch unit is turned off, when the conversion voltage difference is less than the reference voltage and the inductor current flowing through the inductor reaches the output current, the bypass control signal controls the bypass switching circuit to electrically connect the input power to the output power, so that the buck-boost switching regulator is switched from the buck mode to the bypass mode.

In one embodiment, when the buck-boost switching regulator operates in the bypass mode, and when the conversion voltage difference is not less than the reference voltage, the bypass control signal controls the bypass switching circuit to switch the buck-boost switching regulator out of the bypass mode.

In one embodiment, when the buck-boost switching regulator operates in a buck-boost mode, the inductor is alternately connected in series between the input power or the ground potential and between the output power and the ground potential, and when the conversion voltage difference is less than the reference voltage and the inductor current flowing through the inductor reaches the output current, the bypass control signal controls the bypass switching circuit to electrically connect the input power to the output power, so that the buck-boost switching regulator is switched from the buck-boost mode to the bypass mode.

In one embodiment, when the buck-boost switching regulator operates in the bypass mode, and when the conversion voltage difference is not less than the reference voltage, the bypass control signal controls the bypass switching circuit to switch the buck-boost switching regulator out of the bypass mode.

In one embodiment, when the buck-boost switching regulator operates in a boost mode, wherein an input high-side switch of the input switch unit is turned on, and an input low-side switch of the input switch unit is turned off, when the conversion voltage difference is less than the reference voltage and the inductor current flowing through the inductor reaches the output current, the bypass control signal controls the bypass switching circuit to electrically connect the input power to the output power, so that the buck-boost switching regulator is switched from the boost mode to the bypass mode.

In one embodiment, the bypass switching circuit comprises an output high-side switch of the output switch unit and an input high-side switch of the input switch unit, wherein when the conversion voltage difference is less than the reference voltage and the inductor current flowing through the inductor reaches the output current, the bypass control circuit generates the bypass control signal to control both the output high-side switch and the input high-side switch to be turned on, so as to electrically connect the input power to the output power through the inductor.

In one embodiment, the bypass switching circuit comprises a bypass switch which is directly electrically connected between the input power and the output power, wherein when the conversion voltage difference is less than the reference voltage and the inductor current flowing through the inductor reaches the output current, the bypass control circuit generates the bypass control signal to control the bypass switch to be turned on, so as to electrically connect the input power to the output power directly.

In one embodiment, the conversion voltage difference is an absolute value of a difference between the input voltage and the output voltage.

In one embodiment, the reference voltage comprises a first reference voltage and a second reference voltage, wherein when a difference of the output voltage minus the input voltage is less than the first reference voltage, and a difference of the input voltage minus the output voltage is less than the second reference voltage, and the inductor current flowing through the inductor reaches the output current, the bypass control signal is enabled, wherein the first reference voltage and the second reference voltage have one of following relationships: (1) the first reference voltage is equal to the second reference voltage, and neither the first reference voltage nor the second reference voltage is zero; (2) the first reference voltage is equal to zero, and the second reference voltage is not zero; (3) the second reference voltage is equal to zero, and the first reference voltage is not zero; and (4) the first reference voltage is not equal to the second reference voltage, and neither the first reference voltage nor the second reference voltage is zero.

In one embodiment, the bypass control circuit comprises: a threshold control circuit configured to generate an upper threshold and a lower threshold according to the reference voltage; and a comparison circuit configured to compare a to-be-compared signal with the upper threshold and the lower threshold, wherein when the to-be-compared signal ranges between the upper threshold and the lower threshold and the inductor current flowing through the inductor reaches the output current, the bypass control signal is enabled, so as to electrically connect the input power to the output power, wherein the to-be-compared signal, the upper threshold, and the lower threshold have one of following relationships: (1) the to-be-compared signal is the conversion voltage difference, and the upper threshold is the first reference voltage, and the lower threshold is the second reference voltage; (2) the to-be-compared signal is the output voltage, and the upper threshold is a sum of the input voltage and the first reference voltage, and the lower threshold is a difference between the input voltage and the second reference voltage; and (3) the to-be-compared signal is the input voltage, and the upper threshold is a sum of the output voltage and the second reference voltage, and the lower threshold is a difference between the output voltage and the first reference voltage.

In one embodiment, the input switch unit comprises: an input high-side switch, coupled between the input power and the first end of the inductor; and an input low-side switch or an input low-side diode, coupled between the ground potential and the first end of the inductor; wherein the input high-side switch, and the input low-side switch or the input low-side diode are configured to alternatingly connect the first end of the inductor to the input power or the ground potential.

In one embodiment, the output switch unit comprises: an output low-side switch, coupled between the ground potential and the second end of the inductor; and an output high-side switch, coupled between the output power and the second end of the inductor; wherein the output low-side switch and the output high-side switch are configured to alternatingly connect the second end of the inductor to the output power or the ground potential.

From another perspective, the present invention provides a control method of controlling a buck-boost switching regulator to convert an input power into an output power, the buck-boost switching regulator comprising a power switching circuit, and the power switching circuit comprising an input switch unit and an output switch unit, wherein the input switch unit is configured to alternatingly connect a first end of an inductor to the input power or a ground potential, and the output switch unit is configured to alternatingly connect a second end of the inductor to the output power or the ground potential, so as to convert the input power into the output power, wherein the control method comprises: generating a bypass control signal according to a conversion voltage difference between an input voltage of the input power and an output voltage of the output power and according to whether an inductor current flowing through the inductor reaches an output current of the output power; and when the conversion voltage difference is less than a reference voltage and the inductor current flowing through the inductor reaches the output current, the bypass control signal controlling the input power to be electrically connected to the output power, so that the buck-boost switching regulator operates in a bypass mode.

In one embodiment, when the buck-boost switching regulator operates in a buck mode, wherein an output high-side switch of the output switch unit is turned on, and an output low-side switch of the output switch unit is turned off, when the conversion voltage difference is less than the reference voltage and the inductor current flowing through the inductor reaches the output current, the bypass control signal controls the input power electrically connected to the output power, so that the buck-boost switching regulator is switched from the buck mode to the bypass mode.

In one embodiment, when the buck-boost switching regulator operates in the bypass mode, and when the conversion voltage difference is not less than the reference voltage, the bypass control signal controls the buck-boost switching regulator out of the bypass mode.

In one embodiment, when the buck-boost switching regulator operates in a buck-boost mode, wherein the inductor is alternately connected in series between the input power and the ground potential and between the output power and the ground potential, when the conversion voltage difference is less than the reference voltage and the inductor current flowing through the inductor reaches the output current, the bypass control signal controls the input power electrically connected to the output power, so that the buck-boost switching regulator is switched from the buck-boost mode to the bypass mode.

In one embodiment, when the buck-boost switching regulator operates in the bypass mode, and when the conversion voltage difference is not less than the reference voltage, the bypass control signal controls the buck-boost switching regulator out of the bypass mode.

In one embodiment, when the buck-boost switching regulator operates in a boost mode, wherein an input high-side switch of the input switch unit is turned on, and an input low-side switch of the input switch unit is turned off, when the conversion voltage difference is less than the reference voltage and the inductor current flowing through the inductor reaches the output current, the bypass control signal controls the input power electrically connected to the output power, so that the buck-boost switching regulator is switched to the bypass mode.

In one embodiment, when the buck-boost switching regulator operates in the bypass mode, and when the conversion voltage difference is not less than the reference voltage, the bypass control signal controls the buck-boost switching regulator out of the bypass mode.

In one embodiment, when the conversion voltage difference is less than the reference voltage and the inductor current flowing through the inductor reaches the output current, the bypass control signal controls both an output high-side switch and an input high-side switch to be turned on, so as to electrically connect the input power to the output power through the inductor.

In one embodiment, when the conversion voltage difference is less than the reference voltage and the inductor current flowing through the inductor reaches the output current, the bypass control signal controls the bypass switch to be turned on, so as to electrically connect the input power to the output power directly, wherein the bypass switch is directly electrically connected between the input power and the output power.

In one embodiment, the conversion voltage difference is an absolute value of a difference between the input voltage and the output voltage.

In one embodiment, the reference voltage comprises a first reference voltage and a second reference voltage, wherein when a difference of the output voltage minus the input voltage is less than the first reference voltage, and a difference of the input voltage minus the output voltage is less than the second reference voltage, and the inductor current flowing through the inductor reaches the output current, the bypass control signal is enabled, wherein the first reference voltage and the second reference voltage have one of following relationships: (1) the first reference voltage is equal to the second reference voltage, and neither the first reference voltage nor the second reference voltage is zero; (2) the first reference voltage is equal to zero, and the second reference voltage is not zero; (3) the second reference voltage is equal to zero, and the first reference voltage is not zero; and (4) the first reference voltage is not equal to the second reference voltage, and neither the first reference voltage nor the second reference voltage is zero.

In one embodiment, the step of generating the bypass control signal comprises: generating an upper threshold and a lower threshold according to the reference voltage; and comparing a to-be-compared signal with the upper threshold and the lower threshold, wherein when the to-be-compared signal ranges between the upper threshold and the lower threshold and the inductor current flowing through the inductor reaches the output current, the bypass control signal is enabled, so as to electrically connect the input power to the output power, wherein the to-be-compared signal, the upper threshold, and the lower threshold have one of following relationships: (1) the to-be-compared signal is the conversion voltage difference, the upper threshold is the first reference voltage, and the lower threshold is the second reference voltage; (2) the to-be-compared signal is the output voltage, the upper threshold is a sum of the input voltage and the first reference voltage, and the lower threshold is a difference between the input voltage and the second reference voltage; and (3) the to-be-compared signal is the input voltage, the upper threshold is a sum of the output voltage and the second reference voltage, and the lower threshold is a difference between the output voltage and the first reference voltage.

Advantages of the present invention include that, with the bypass mode, and the present invention switching to the bypass mode only when the inductor current reaches the output current, the present invention can decrease ringing without a low on-resistance bypass switch; that the present invention can reduce the die size and area; and that the present invention can adaptively mitigate ringing in any situation.

The objectives, technical details, features, and effects of the present invention will be better understood with regard to the detailed description of the embodiments below, with reference to the attached drawings.

BRIEF DESCRIPTION OF THE DRAWINGS

FIG. 3B is a table showing thresholds in a voltage judgment circuit of a bypass control circuit of a buck-boost switching regulator according to an embodiment of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
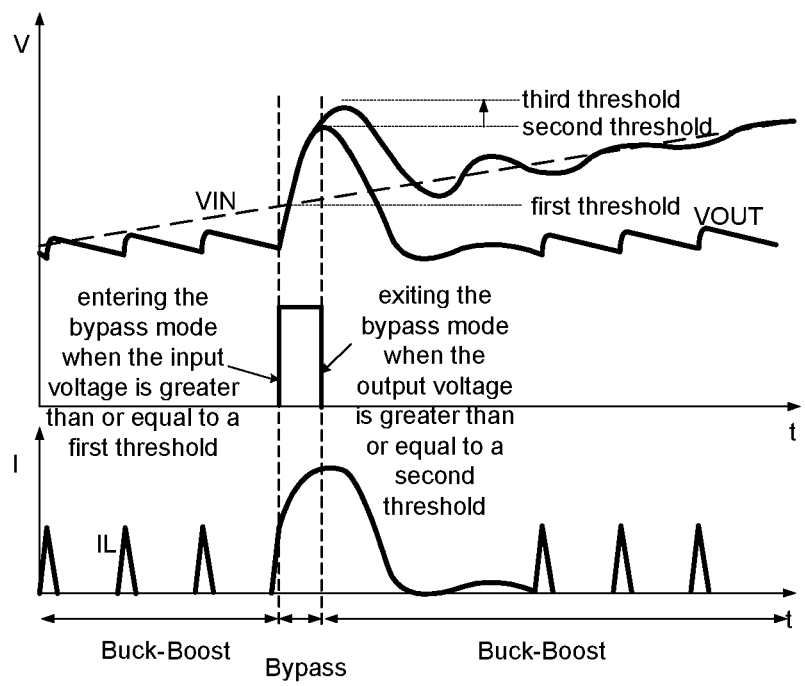
FIG. 1 is a schematic diagram of signal waveforms of a conventional buck-boost switching regulator.
Figure 2:
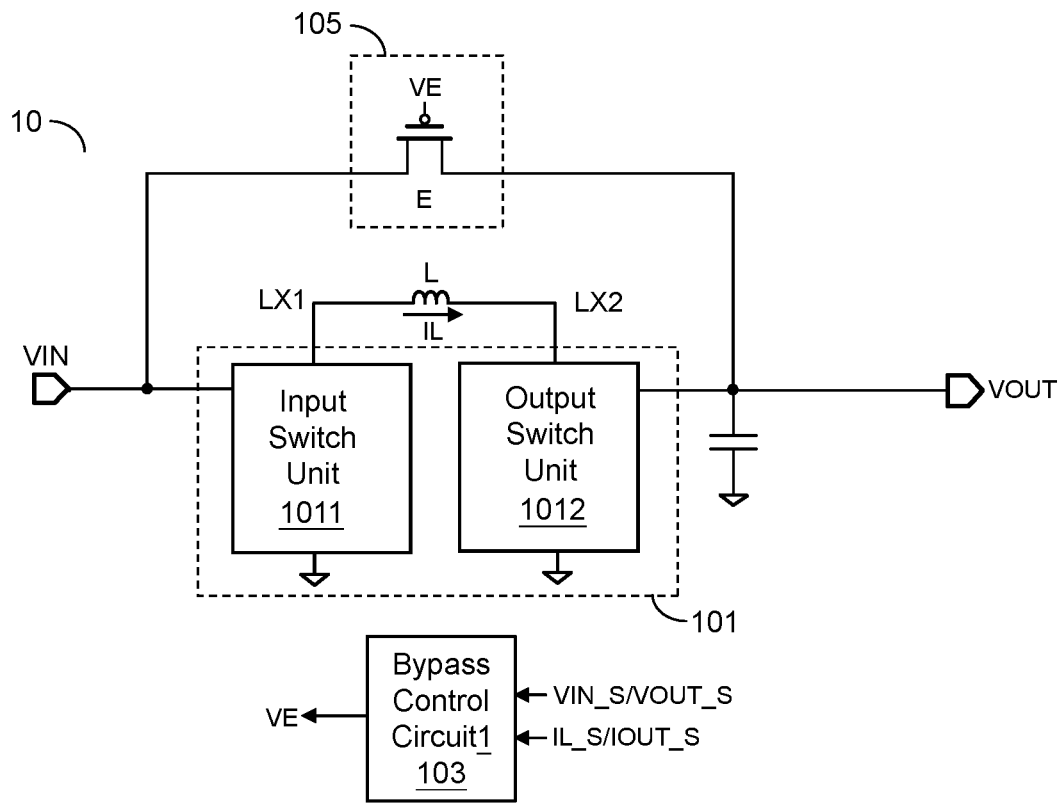
FIG. 2 is a schematic circuit diagram showing a buck-boost switching regulator according to an embodiment of the present invention.

FIG. 2 is a schematic circuit diagram showing a buck-boost switching regulator according to an embodiment of the present invention. The buck-boost switching regulator 10 of the present invention includes a power switch circuit 101, a bypass switching circuit 105, and a bypass control circuit 103.

The power switch circuit 101 includes an input switch unit 1011 and an output switch unit 1012, wherein the input switch unit 1011 is configured to switch the first end of the inductor L (e.g., LX1 shown in FIG. 2) between the input voltage VIN of the input power and the ground potential, and the output switch unit 1012 is configured to switch the second end of the inductor L (e.g., LX2 shown in FIG. 2) between the output voltage VOUT of the output power and the ground potential. From one point of view, the power switch circuit 101 and the inductor L together form a buck-boost switching regulator configured to convert the input voltage VIN to the output voltage VOUT, wherein the input voltage VIN can be greater than, equal to, or less than the output voltage VOUT.

Still referring to FIG. 2, the bypass control circuit 103 is configured to generate a bypass control signal VE according to a conversion voltage difference between the input voltage VIN and the output voltage VOUT, and according to whether the inductor current IL flowing through the inductor L reaches the output current IOUT of the output power or not, wherein the conversion voltage difference is the difference between the input voltage VIN and the output voltage VOUT. The conversion voltage difference can include the difference of the input voltage VIN minus the output voltage VOUT, and/or the difference of the output voltage VOUT minus the input voltage VIN. When the conversion voltage difference is less than a reference voltage, and the inductor current IL flowing through the inductor L reaches the output current IOUT, the bypass control signal VE controls the bypass switching circuit 105 to electrically connect the input voltage VIN to the output voltage VOUT, so that the buck-boost switching regulator 10 operates in a bypass mode.

It should be noted that the so-called "when the inductor current IL flowing through the inductor L reaches the output current IOUT" refers to the time point when the level of the inductor current IL passes the level of the output current IOUT. Please refer to FIG. 5A; in one case, the level of the inductor current IL gradually decreases from higher than the level of the output current IOUT and pass the level of the output current IOUT at the time point t1, which is "when the inductor current IL flowing through the inductor L reaches the output current IOUT", and the bypass control signal VE is enabled at the time point t1 to switch from low level to high level. On the other hand, please refer to FIG. 5B; in this case, the level of the inductor current IL gradually increase from lower than the level of the output current IOUT to pass the level of the output current IOUT at the time point t0, which also is "when the inductor current IL flowing through the inductor L reaches the output current IOUT", and the bypass control signal VE is enabled at the time point t0 to switch from low level to high level.

Figure 4:
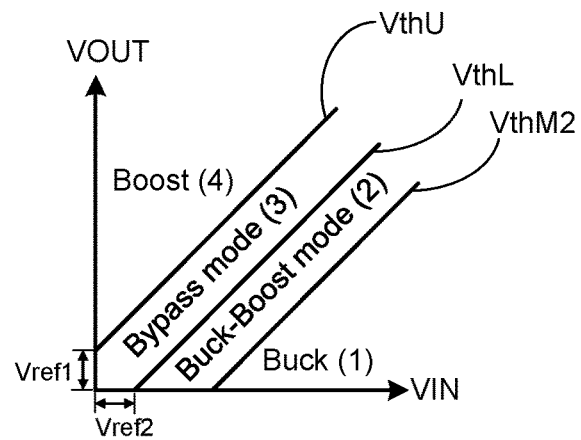
FIG. 4 is a characteristic diagram showing an operation mode of a buck-boost switching regulator according to an embodiment of the present invention.

Please also refer to FIG. 4. FIG. 4 is a characteristic diagram showing an operation mode of a buck-boost switching regulator according to an embodiment of the present invention. In one embodiment, the buck-boost switching regulator 10 of the present invention can operate in a bypass mode. The buck-boost switching regulator 10 of the present invention operates in the bypass mode when the conversion voltage difference is less than the reference voltage and the inductor current IL flowing through the inductor L reaches the output current IOUT.

Taking FIG. 4 as an example, in this embodiment, the above-mentioned reference voltage include a first reference voltage Vref1 and a second reference voltage Vref2, which correspond to the difference of the output voltage VOUT minus the input voltage VIN and the difference of the input voltage VIN minus the output voltage VOUT, respectively. In the present embodiment, when VOUT−VIN<Vref1 and VIN−VOUT<Vref2, and when IL=IOUT, the buck-boost switching regulator 10 operates in the bypass mode.

Please continue referring to FIG. 2. In one embodiment, as shown in FIG. 2, the bypass switching circuit 105 includes a bypass switch E, and the bypass control signal VE controls the bypass switch E to electrically connect the input voltage VIN to the output voltage VOUT when the conversion voltage difference is less than the reference voltage and the inductor current IL flowing through the inductor L reaches the output current IOUT. In the embodiment shown in FIG. 2, is directly electrically connected between the input voltage VIN and the output voltage VOUT. In the bypass mode, when the conversion voltage difference is less than the reference voltage and the inductor current IL flowing through the inductor L reaches the output current IOUT, the bypass switch E is turned ON to electrically connect the input voltage VIN to the output voltage VOUT directly. In one embodiment, the conversion voltage difference is an absolute value of the difference between the input voltage VIN and the output voltage VOUT.

Figure 3A:
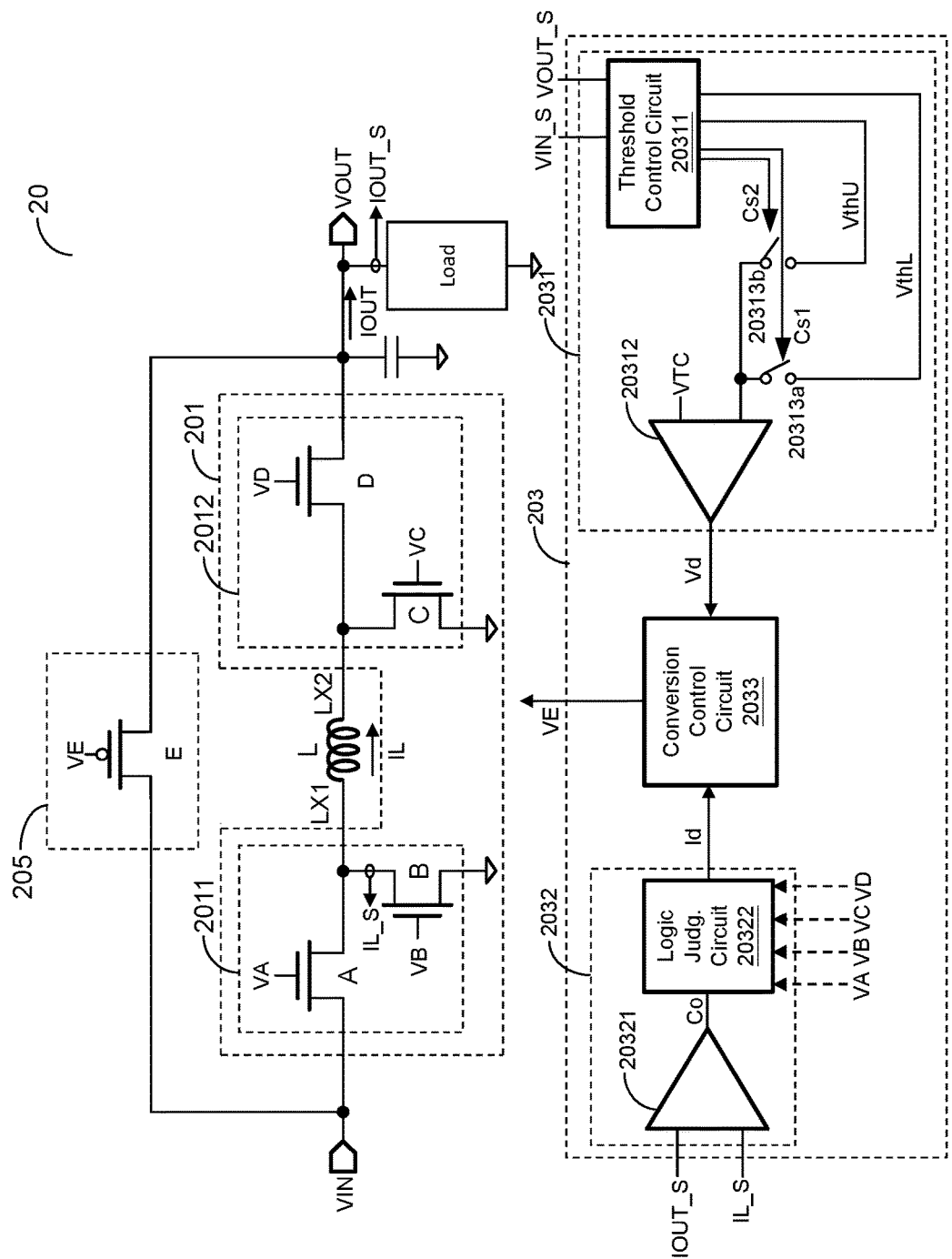
FIG. 3A is a schematic circuit diagram showing a buck-boost switching regulator according to another embodiment of the present invention.

FIG. 3A is a schematic circuit diagram showing a buck-boost switching regulator according to another embodiment of the present invention. The inductor L, the power switch circuit 201, and the bypass switch E in the present embodiment are similar to the inductor L, the power switch circuit 101, and the bypass switch E in FIG. 2, so their descriptions are omitted. As shown in FIG. 3A, the input switch unit 2011 includes an input high-side switch A and an input low-side switch B (or an input low-side diode in another embodiment). The input high-side switch A is coupled between the input voltage VIN and the first end LX1 of the inductor L, and the input low-side switch B is coupled between the ground potential and the first end LX1 of the inductor L. The control signals VA and VB are configured to control the input high-side switch A, or control the input high-side switch A and the input low-side switch B, to switch the first end LX1 of the inductor L between the input voltage VIN and the ground potential. The output switch unit 2012 includes an output low-side switch C and an output high-side switch D. The output low-side switch C is coupled between the ground potential and the second end LX2 of the inductor L, and the output high-side switch D is coupled between the output voltage VOUT and the second end LX2 of the inductor L. The control signals VC and VD are configured to control the output low-side switch C and the output high-side switch D, so as to switch the second end LX2 of the inductor L between the output voltage VOUT and the ground potential. The input voltage VIN is converted into the output voltage VOUT by the operations of the input high-side switch A, the input low-side switch B, the output low-side switch C, and the output high-side switch D.

As shown in FIG. 3A, the bypass control circuit 203 includes a voltage judgment circuit 2031 and a current judgment circuit 2032. The voltage judgment circuit 2031 includes a threshold control circuit 20311 and a comparison circuit 20312. The threshold control circuit 20311 is configured to generate an upper threshold VthU, a lower threshold VthL, and plural control signals Cs1 and Cs2 according to the reference voltage. The plural control signals Cs1 and Cs2 are configured to control the switches 20313a and 20313b, respectively, so as to input the lower threshold VthL and the upper threshold VthU to the comparison circuit 20312, respectively. The comparison circuit 20312 is configured to compare a to-be-compared signal VTC with the upper threshold VthU and the lower threshold VthL. When the to-be-compared signal VTC ranges between the upper threshold VthU and the lower threshold VthL, the voltage judgment signal Vd is enabled.

The current judgment circuit 2032 includes a comparison circuit 20321 and a logic judgment circuit 20322. The comparison circuit 20321 is configured to compare an output current sensing signal TOUT_S and an inductor current sensing signal IL_S. When the inductor current sensing signal IL_S reaches the output current sensing signal TOUT_S, the output signal Co is enabled. The logic judgment circuit 20322 is configured to generate a current judgment signal Id according to the output signal Co and optionally according to the control signals VA, VB, VC, and/or VD. The conversion control circuit 2033 is configured to generate the bypass control signal VE according to the current judgment signal Id and the voltage judgment signal Vd. When both the current judgment signal Id and the voltage judgment signal Vd are at the enable level, the bypass control signal VE is enabled, whereby the bypass switch E is turned on, and the bypass mode is entered to electrically connect the input voltage VIN to the output voltage VOUT. In addition, it should be noted that the bypass control circuit 203 of the buck-boost switching regulator 20 of the present invention is not limited to the circuit structure shown in FIG. 3A; any other feasible circuit structure can be used, as long as the input voltage VIN can be electrically connected to the output voltage VOUT. The circuit structure shown in FIG. 3A is an exemplary embodiment.

FIG. 3B is a table showing thresholds in the voltage judgment circuit of the bypass control circuit of the buck-boost switching regulator according to an embodiment of the present invention, which lists configurations of the to-be-compared signal VTC, the upper threshold VthU, and the lower threshold VthL. In one embodiment, the to-be-compared signal VTC, the upper threshold VthU, and the lower threshold VthL have one of the following relationships: (1) the to-be-compared signal VTC is positively correlated with the conversion voltage difference VOUT−VIN, and the upper threshold VthU is the first reference voltage Vref1, and the lower threshold VthL is the second reference voltage Vref2; (2) the to-be-compared signal VTC is positively correlated with the output voltage VOUT, and the upper threshold VthU is the sum of the input voltage VIN and the first reference voltage Vref1, and the lower threshold VthL is the difference between the input voltage VIN and the second reference voltage Vref2; and (3) the to-be-compared signal VTC is positively correlated with the input voltage VIN, and the upper threshold VthU is the sum of the output voltage VOUT and the second reference voltage Vref2, and the lower threshold VthL is the difference between the output voltage VOUT and the first reference voltage Vref1.

To be more specific, in one embodiment, when the to-be-compared signal VTC is the input voltage sensing signal VIN_S, the upper threshold VthU is the value of the output voltage sensing signal VOUT_S plus the second reference voltage Vref2, and the lower threshold VthL is the value of the output voltage sensing signal VOUT_S minus the first reference voltage Vref1. In another embodiment, when the to-be-compared signal VTC is the output voltage sensing signal VOUT_S, the upper threshold VthU is the value of the input voltage sensing signal VIN_S plus the first reference voltage Vref1, and the lower threshold VthL is the value of the input voltage sensing signal VIN_S minus the second reference voltage Vref2. In yet another embodiment, when the to-be-compared signal VTC is the value of the output voltage sensing signal VOUT_S minus the input voltage sensing signal VIN_S, the upper threshold VthU is the first reference voltage Vref1, and the lower threshold VthL is the second reference voltage Vref2. In the above description, the input voltage sensing signal VIN_S is the sensing signal of the input voltage VIN, and the output voltage sensing signal VOUT_S is the sensing signal of the output voltage VOUT.

Figure 3C:
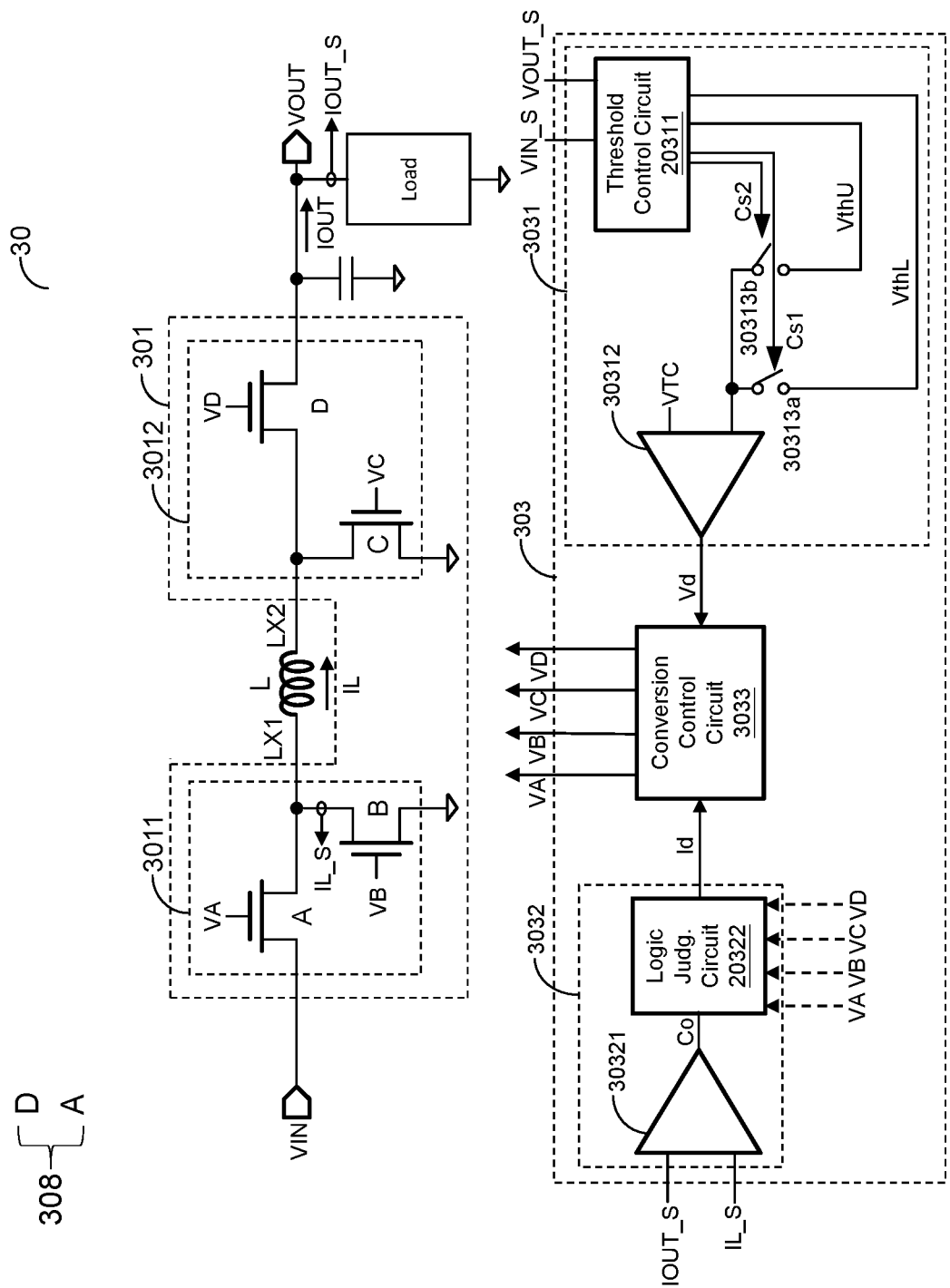
FIG. 3C is a schematic circuit diagram showing a buck-boost switching regulator according to yet another embodiment of the present invention.

FIG. 3C is a schematic circuit diagram showing a buck-boost switching regulator according to yet another embodiment of the present invention. The inductor L and the power switch circuit 301 in the present embodiment are similar to the inductor L and the power switch circuit 101 in FIG. 2, and the input switch unit 3011, the output switch unit 3012, and the bypass control circuit 303 in the present embodiment are similar to the input switch unit 2011, the output switch unit 2012, and the bypass control circuit 203 in FIG. 3A, so their descriptions are omitted. The difference between the present embodiment and the embodiment of FIG. 3A is that the bypass mode of the present embodiment controls the input high-side switch A and the output high-side switch D to be turned on, that is, the bypass switching circuit 308 in the present embodiment includes the output high-side switch D and the input high-side switch A of the input switch unit. Therefore, the present embodiment does not need an additional bypass switch, which can save the layout area of the additional bypass switch. When the conversion voltage difference is less than the reference voltage and the inductor current IL flowing through the inductor L reaches the output current IOUT, the bypass control circuit 303 enables the bypass control signals VA and VD, and disables the bypass control signals VB and VC, so that the output high-side switch D and the input high-side switch A are controlled to electrically connect the input voltage VIN to the output voltage VOUT through the inductor L. In one embodiment, the conversion control circuit 3033 is also configured to control the input high-side switch A, the input low-side switch B, the output low-side switch C, and the output high-side switch D for corresponding power conversion in other modes (such as buck mode or boost mode). It should be noted that the bypass control circuit 303 of the buck-boost switching regulator 30 of the present invention is not limited to the circuit structure shown in FIG. 3C; any other feasible circuit structure can be used. The circuit structure shown in FIG. 3C is an exemplary embodiment.

Figure 3D:
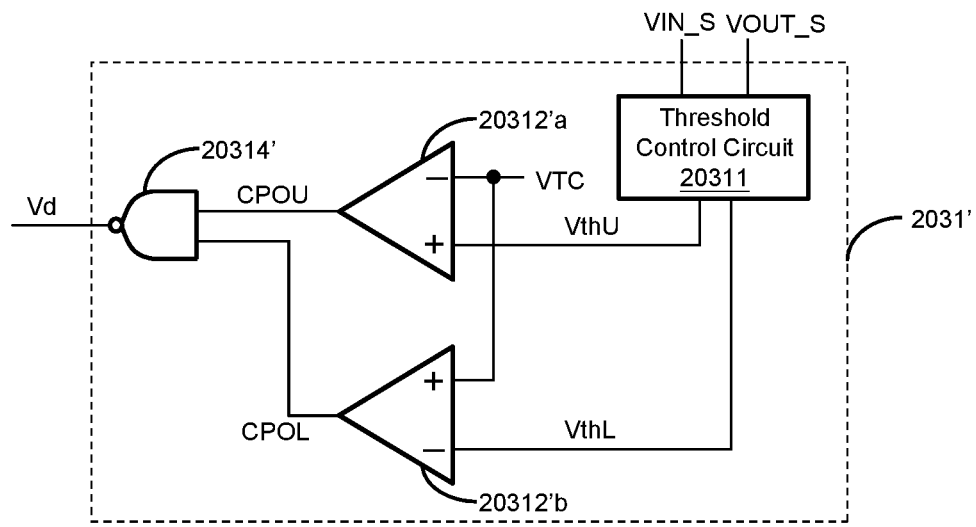
FIG. 3D is a schematic circuit diagram showing another embodiment of the voltage judgment circuit of the bypass control circuit of the buck-boost switching regulator of FIGS. 3A and 3C according to an embodiment of the present invention.

FIG. 3D is a schematic circuit diagram showing another embodiment of the voltage judgment circuit of the bypass control circuit of the buck-boost switching regulator of FIGS. 3A and 3C according to an embodiment of the present invention. The to-be-compared signal VTC, the upper threshold VthU, and the lower threshold VthL of the present embodiment can be configured as the embodiment shown in FIG. 3B. The voltage judgment circuit 2031' includes a threshold control circuit 20311 and comparison circuits 20312'a and 20312'b. The threshold control circuit 20311 is configured to generate an upper threshold VthU and a lower threshold VthL according to the reference voltage. The comparison circuit 20312'a is configured to compare the to-be-compared signal VTC and the upper threshold VthU to generate the comparison result CPOU, and the comparison circuit 20312'b is configured to compare the to-be-compared signal VTC and the lower threshold VthL to generate the comparison result CPOL. When the to-be-compared signal VTC is less than the upper threshold VthU and the to-be-compared signal VTC is greater than the lower threshold VthL, the voltage judgment signal Vd is enabled through, for example, but not limited to, the inverse gate 20314' shown in FIG. 3D.

In one embodiment, referring to FIG. 3C, the output current sensing signal IOUT S can be sensed by connecting a sensing resistor in series between the output voltage VOUT and the load, for example. In one embodiment, the inductor current sensing signal IL_S can be obtained by detecting the current through the input high-side switch A, the input low-side switch B, the output low-side switch C, or the output high-side switch D. In another embodiment, the inductor current sensing signal IL_S can be measured through an inductor current detection circuit such as shown in FIG. 3E.

Figure 3E:
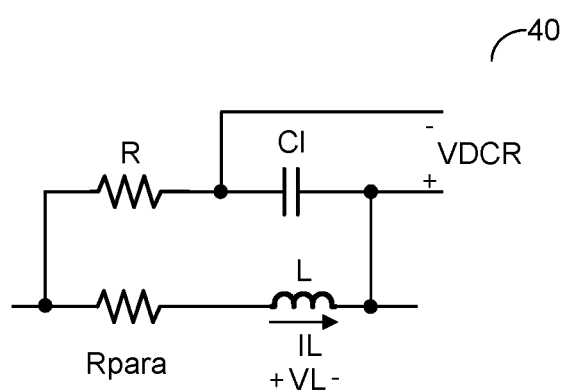
FIG. 3E is a schematic circuit diagram showing an exemplary inductor current detection circuit according to an embodiment of the present invention.

FIG. 3E is a schematic circuit diagram showing an exemplary inductor current detection circuit according to an embodiment of the present invention. The inductor current detection circuit 40 includes a capacitor C1 and a resistor R, which are connected in series with each other and the series circuit is further connected in parallel with the inductor L and the parasitic resistance Rpara of the inductor L, whereby the cross-voltage VDCR of the capacitor C1 is related to the cross-voltage VL of the inductor L, and a signal relevant to the inductor current IL can be obtained.

Please continue to refer to FIG. 4. In one embodiment, the buck-boost switching regulator of the present invention can operate in a boost mode, a bypass mode, a buck-boost mode, or a buck mode. In the present embodiment, the buck-boost mode exists only under the bypass mode. As shown in FIG. 4, in the present embodiment, in the order from large to small and from positive to negative of the difference between the output voltage VOUT and the input voltage VIN, the buck-boost switching regulator operates in the corresponding modes: the boost mode, the bypass mode, the buck-boost mode, and the buck mode.

The buck-boost switching regulator of the present invention operates in the bypass mode when the conversion voltage difference is less than the reference voltage and the inductor current IL flowing through the inductor L reaches the output current IOUT, and when the conversion voltage difference is not lower than the reference voltage, it can operate in the buck mode, the buck-boost mode, or the boost mode according to the relationship between the input voltage VIN and the output voltage VOUT.

In one embodiment, the reference voltage can include a first reference voltage and a second reference voltage. As shown in FIG. 4, the first reference voltage is marked as Vref1; the second reference voltage is marked as Vref2; the upper threshold is marked as VthU; the lower threshold is marked as VthL; and the second intermediate threshold is marked as VthM2. When the difference of the output voltage VOUT minus the input voltage VIN is less than the first reference voltage Vref1, and the difference of the input voltage VIN minus the output voltage VOUT is less than the second reference voltage Vref2, and when the inductor current IL flowing through the inductor L reaches the output current IOUT, the bypass control signal VE is enabled, so that the buck-boost switching regulator of the present invention operates in the bypass mode. In one embodiment, the buck-boost switching regulator of the present invention operates in the boost mode when the difference of the output voltage VOUT minus the input voltage VIN is not less than the first reference voltage Vref1; operates in the buck-boost mode when the difference of the input voltage VIN minus the output voltage VOUT ranges between the second reference voltage Vref2 and the second intermediate threshold VthM2; and operates in the buck mode when the difference of the input voltage VIN minus the output voltage VOUT is not less than the second intermediate threshold VthM2. In one embodiment, the first reference voltage Vref1 and the second reference voltage Vref2 have one of the following relationships: (1) the first reference voltage Vref1 is equal to the second reference voltage Vref2, and neither the first reference voltage Vref1 nor the second reference voltage Vref2 is zero; (2) the first reference voltage Vref1 is equal to zero, and the second reference voltage Vref2 is not zero; (3) the second reference voltage Vref2 is equal to zero, and the first reference voltage Vref1 is not zero; and (4) the first reference voltage Vref1 is not equal to the second reference voltage Vref2, and neither the first reference voltage Vref1 nor the second reference voltage Vref2 is zero.

Figure 5A:
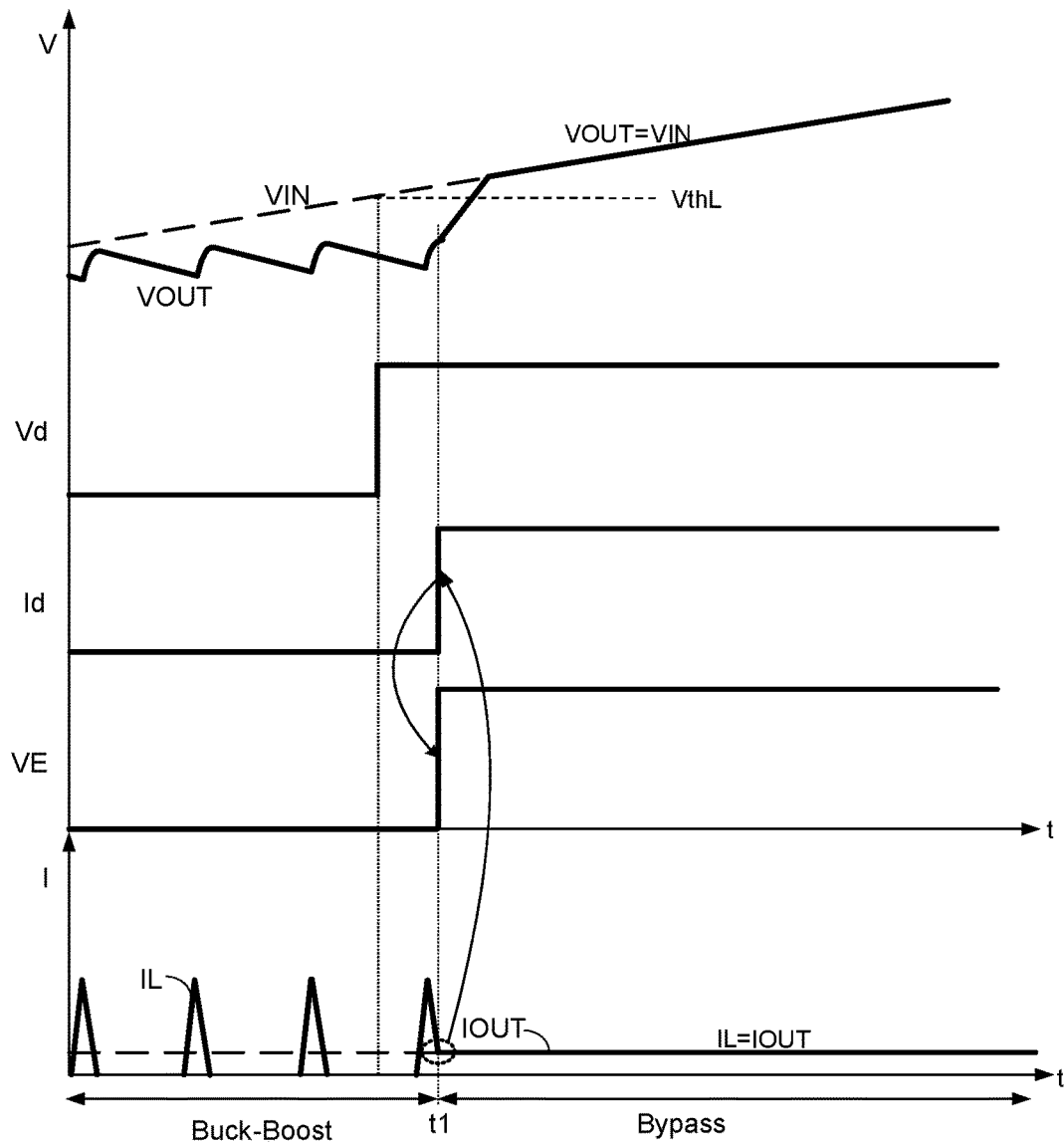
FIG. 5A is a schematic diagram showing signal waveforms of the circuit of FIG. 3A.

FIG. 5A is a schematic diagram showing signal waveforms of the circuit of FIG. 3A. The input voltage VIN, the output voltage VOUT, the bypass control signal VE, the voltage judgment signal Vd, the current judgment signal Id, the inductor current IL, and the output current IOUT are shown in FIG. 5A. Please refer to FIG. 5A together with FIG. 3A. When the buck-boost switching regulator 20 operates in the buck-boost mode and both the input low-side switch B (or an input low-side diode) of the input switch unit 2011 and the output high-side switches D of the output switch unit 2012 are turned on, and when the conversion voltage difference is less than the reference voltage (that is, the input voltage VIN is higher than the lower threshold VthL) and the inductor current IL flowing through the inductor L reaches the output current IOUT, as shown at the time point t1 in FIG. 5A, he bypass control signal VE controls the bypass switching circuit 205 to electrically connect the input power to the output power, so that the buck-boost switching regulator 20 is switched from the buck-boost mode to the bypass mode.

Figure 5B:
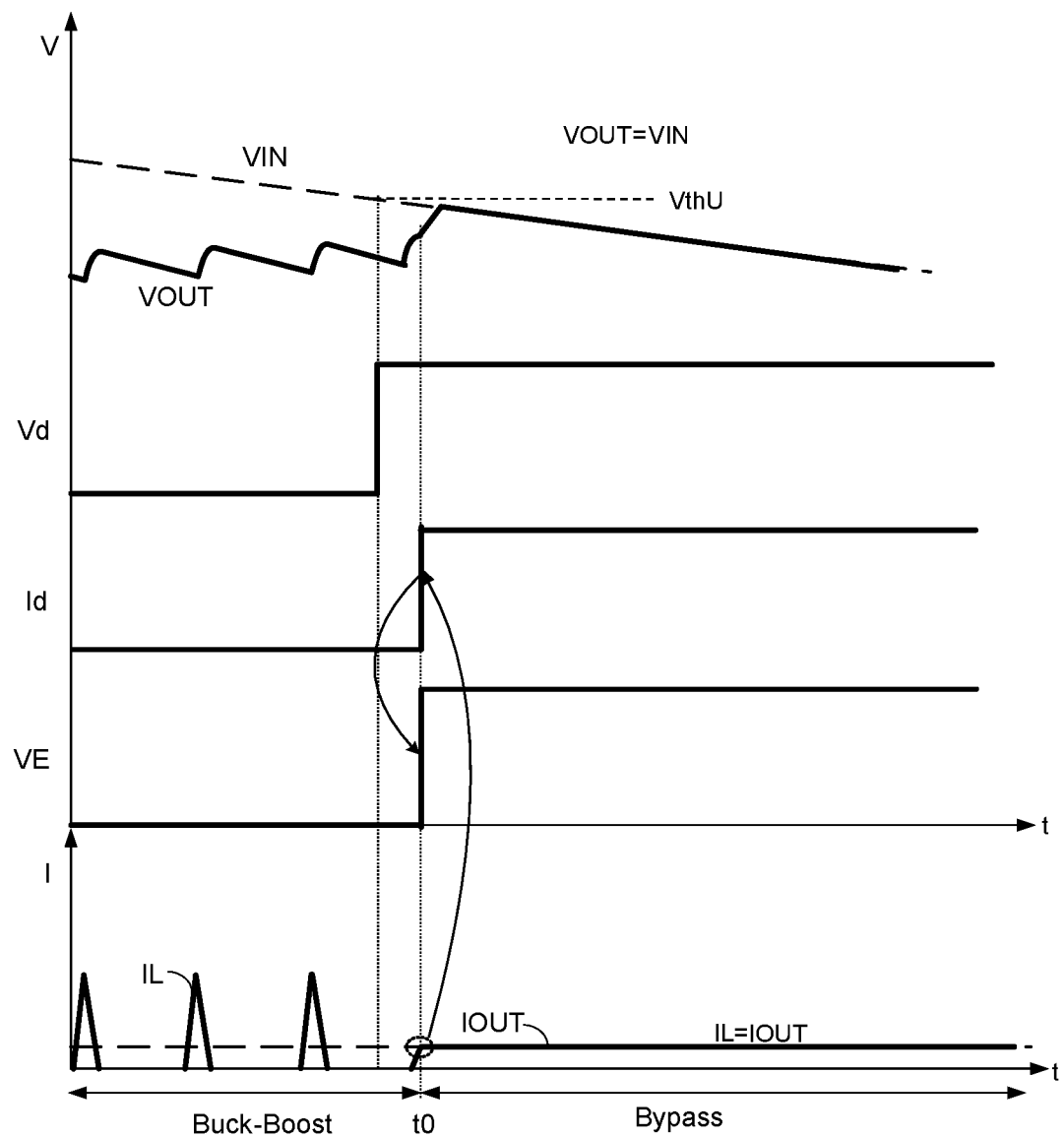
FIG. 5B is a schematic diagram showing signal waveforms of the circuit of FIG. 3A according to another embodiment of the present invention.

FIG. 5B is a schematic diagram showing signal waveforms of the circuit of FIG. 3A according to another embodiment of the present invention. The input voltage VIN, the output voltage VOUT, the bypass control signal VE, the voltage judgment signal Vd, the current judgment signal Id, the inductor current IL, and the output current IOUT are shown in FIG. 5B. Please refer to FIG. 5B together with FIG. 3A, when the buck-boost switching regulator 20 operates in the buck-boost mode and both the input high-side switch A of the input switch unit 2011 and the output low-side switch C of the output switch unit 2012 are turned on, and when the conversion voltage difference is less than the reference voltage (that is, the input voltage VIN is less than the upper threshold VthU) and the inductor current IL flowing through the inductor L reaches the output current IOUT, as shown at the time point t0 in FIG. 5B, the bypass control signal VE controls the bypass switching circuit 205 to electrically connect the input power to the output power, so that the buck-boost switching regulator 20 is switched from the buck-boost mode to the bypass mode.

Figure 6A:
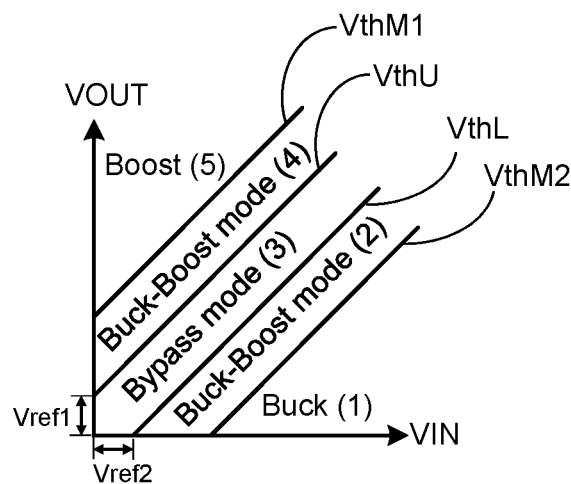
FIG. 6A is a characteristic diagram showing an operation mode of a buck-boost switching regulator according to another embodiment of the present invention.
Figure 6B:
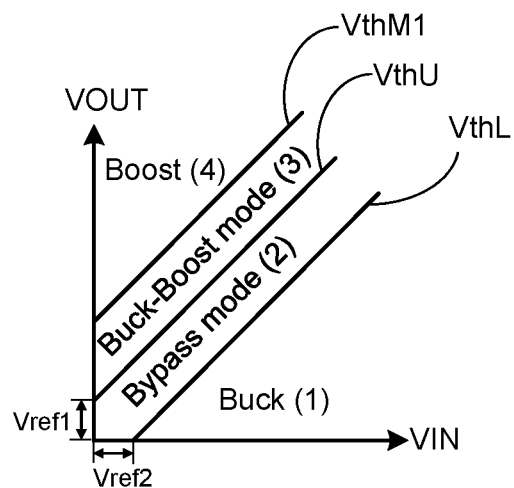
FIG. 6B is a characteristic diagram showing an operation mode of a buck-boost switching regulator according to yet another embodiment of the present invention.
Figure 6C:
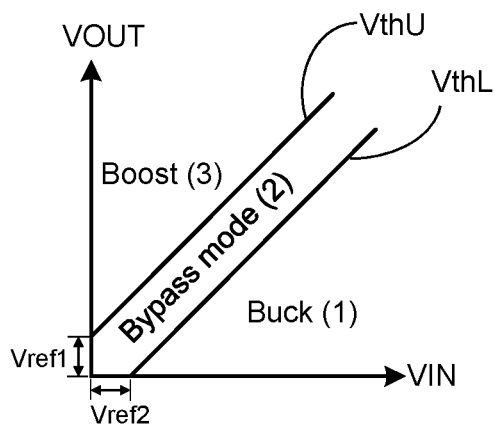
FIG. 6C is a characteristic diagram showing an operation mode of a buck-boost switching regulator according to yet another embodiment of the present invention.

FIGS. 6A to 6C are characteristic diagrams showing operating modes of a buck-boost switching regulator according to several embodiments of the present invention. It should be noted that FIG. 6A, FIG. 6B, or FIG. 6C are applicable to any of the embodiments of FIG. 3A and FIG. 3C. Similarly, FIG. 4 is applicable to any of the embodiments of FIG. 3A and FIG. 3C. As shown in FIG. 6A, the first reference voltage is marked as Vref1; the second reference voltage is marked as Vref2; the upper threshold is marked as VthU; the lower threshold is marked as VthL; the first intermediate threshold is marked as VthM1; and the second intermediate threshold is marked as VthM2. The difference between the present embodiment and FIG. 4 is that the buck-boost switching regulator of the present embodiment also can operate in the buck-boost mode according to the input voltage VIN and the output current IOUT when the conversion voltage difference is not less than the first reference voltage Vref1 (i.e., the buck-boost mode exists also above the bypass mode). As shown in FIG. 6A, in the order from large to small of the conversion voltage difference (e.g., VOUT−VIN), the buck-boost switching regulator operates in the corresponding modes: the boost mode, the buck-boost mode, the bypass mode, the buck-boost mode, and the buck mode.

As shown in FIG. 6B, the first reference voltage is marked as Vref1, the second reference voltage is marked as Vref2, the upper threshold is marked as VthU, the lower threshold is marked as VthL, and the first intermediate threshold is marked as VthM1. The difference between the present embodiment and FIG. 6A is that the present embodiment only has a buck-boost mode above the bypass mode. As shown in FIG. 6B, in the order from large to small of the conversion voltage difference (e.g., VOUT−VIN), the buck-boost switching regulator operates in corresponding modes: the boost mode, the buck-boost mode, the bypass mode, and the buck mode.

FIG. 6C is a characteristic diagram showing an operation mode of a buck-boost switching regulator according to yet another embodiment of the present invention. As shown in FIG. 6C, the first reference voltage is marked as Vref1; the second reference voltage is marked as Vref2; the upper threshold is marked as VthU; and the lower threshold is marked as VthL. The difference between the present embodiment and FIG. 6A is that the present embodiment does not have a buck-boost mode. As shown in FIG. 6C, in the order from large to small of the conversion voltage difference, the buck-boost switching regulator operates in the corresponding modes: the boost mode, the bypass mode, and the buck mode.

Figure 7A:
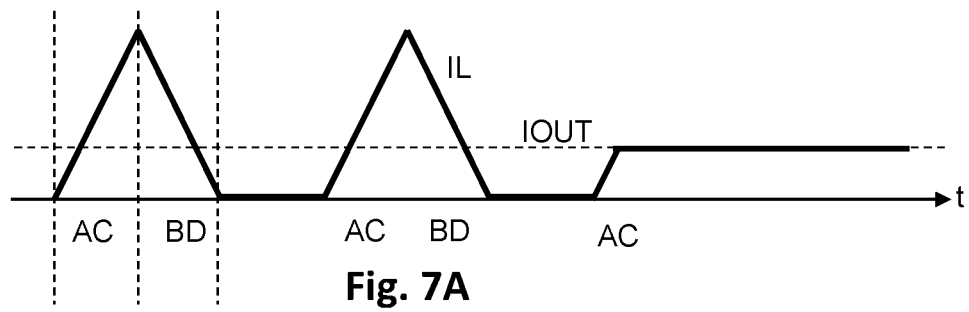
FIGS. 7A to 7E are schematic diagrams showing signal waveforms of switching from a buck-boost mode, a buck mode, and a boost mode to a bypass mode, respectively, according to an embodiment of the present invention.

FIG. 7A to FIG. 7E are schematic diagrams showing signal waveforms of switching from the buck-boost mode, the buck mode, and the boost mode to the bypass mode, respectively, according to an embodiment of the present invention. It should be noted that FIGS. 7A to 7E can be applied to any of the embodiments of FIG. 3A and FIG. 3C. Similarly, the waveform diagrams of the inductor current IL and the output current IOUT in FIG. 5A and FIG. 5B are also applicable to any of the embodiments in FIG. 3A and FIG. 3C. Please refer to FIG. 7A together with FIG. 3A, when the buck-boost switching regulator 20 operates in the buck-boost mode and when both the input high-side switch A of the input switch unit 2011 and the output low-side switch C of the output switch unit 2012 are turned on (as shown by "AC" of FIG. 7A, AC represents the period during which both the input high-side switch A and the output low-side switch C are turned on, and BD represents the period during which both the input low-side switch B and the output high-side switch D are turned on), when the conversion voltage difference is less than the reference voltage and the inductor current IL flowing through the inductor L reaches the output current IOUT, the bypass control signal VE controls the bypass switching circuit 205 to electrically connect the input power to the output power, so that the buck-boost switching regulator 20 is switched from the buck-boost mode to the bypass mode. According to the present invention, besides the bypass control circuit 203 enabling the bypass control signal VE when the conversion voltage difference is less than the reference voltage and when the inductor current IL flowing through the inductor L reaches the output current IOUT, the logic judgment circuit 20322 in the bypass control circuit 203 can further decide to generate the current judgment signal Id when a specific combination of switches are turned on or off, according to how the control signals VA, VB, VC and/or VD control the corresponding switches. For example, as shown in FIG. 7A and FIG. 5A, the logic judgment circuit 203221 enables the current judgment signal Id when the following conditions are both met: that the inductor current IL reaches the output current IOUT and that both the input high-side switch A and the output low-side switch C are turned on according to the control signals VA and VC. Of course, in another embodiment, the logic judgment circuit 20322 can enable the current judgment signal Id when both the input low-side switch B and the output high-side switch D are turned on according to the control signals VB and VD.

Figure 7B:
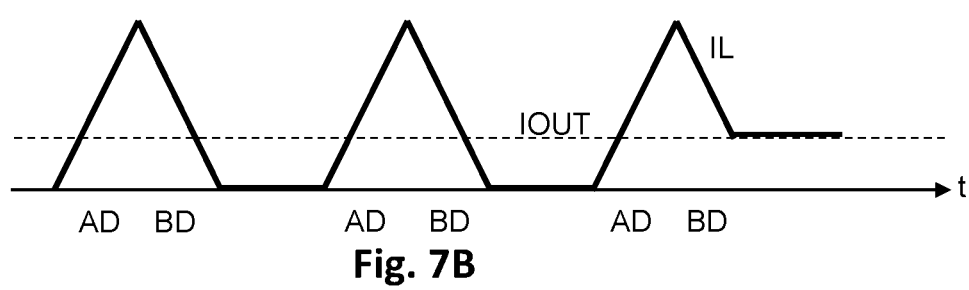

Please refer to FIG. 7B together with FIG. 3A. In the present embodiment, when the buck-boost switching regulator 20 operates in a buck mode and both the input low-side switch B (or input low-side diode) of the input switch unit 2011 and the output high-side switch D of the output switch unit 2012 are turned on (as shown by "BD" of FIG. 7B), and when the conversion voltage difference is less than the reference voltage and the inductor current IL flowing through the inductor L reaches the output current IOUT, the bypass control signal VE controls the bypass switching circuit 205 to electrically connect the input power to the output power, so that the buck-boost switching regulator 20 is switched from the buck mode to the bypass mode.

Figure 7C:
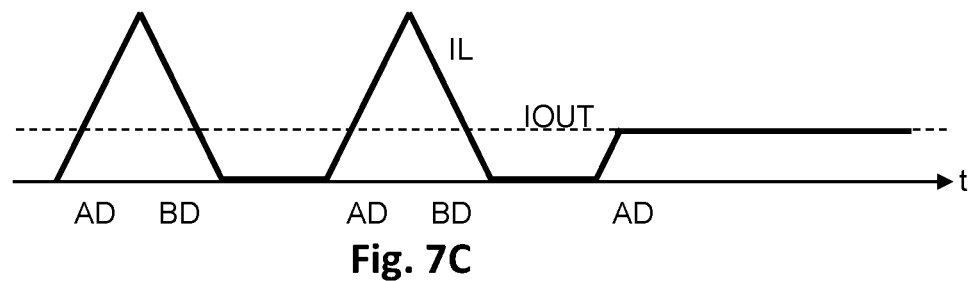

Please refer to FIG. 7C together with FIG. 3A. In the present embodiment, when the buck-boost switching regulator 20 operates in a buck mode and both the input high-side switch A of the input switch unit 2011 and the output high-side switches D of the output switch unit 2012 are turned on (as shown by "AD" of FIG. 7C, AD represents the period during which both the input high-side switch A and the output high-side switch D are turned on), and when the conversion voltage difference is less than the reference voltage and the inductor current IL flowing through the inductor L reaches the output current IOUT, the bypass control signal VE controls the bypass switching circuit 205 to electrically connect the input power to the output power, so that the buck-boost switching regulator 20 is switched from the buck mode to the bypass mode.

Figure 7D:
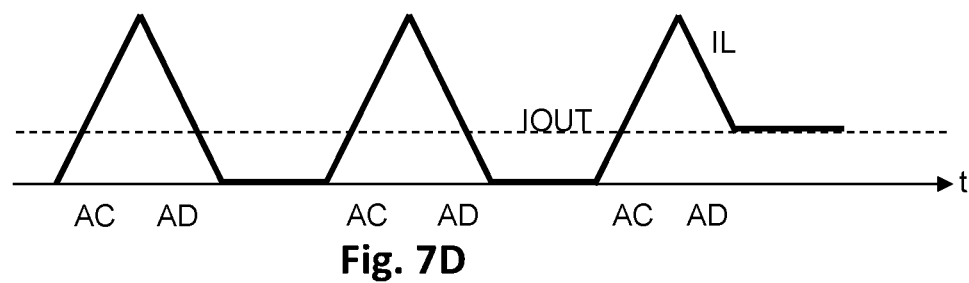

Please refer to FIG. 7D together with FIG. 3A. When the buck-boost switching regulator 20 operates in a boost mode and both the input high-side switch A of the input switch unit 2011 and the output high-side switch D of the output switch unit 2012 are turned on (as shown by "AD" of FIG. 7D), and when the conversion voltage difference is less than the reference voltage and the inductor current IL flowing through the inductor L reaches the output current IOUT, the bypass control signal VE controls the bypass switching circuit 205 to electrically connect the input power to the output power, so that the buck-boost switching regulator 20 is switched from the boost mode to the bypass mode.

Figure 7E:
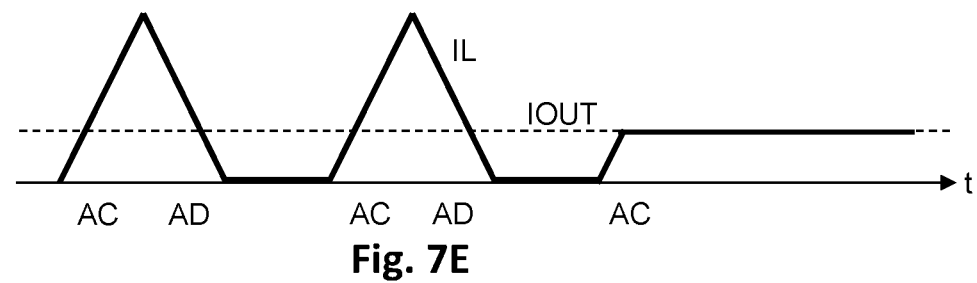

Please refer to FIG. 7E together with FIG. 3A. When the buck-boost switching regulator 20 operates in the boost mode and both the input high-side switch A of the input switch unit 2011 and the output low-side switch C of the output switch unit 2012 are turned on (as shown by "AC" of FIG. 7E), when the conversion voltage difference is less than the reference voltage and the inductor current IL flowing through the inductor L reaches the output current IOUT, the bypass control signal VE controls the bypass switching circuit 205 to electrically connect the input power to the output power, so that the buck-boost switching regulator 20 is switched from the boost mode to the bypass mode.

Figure 8:
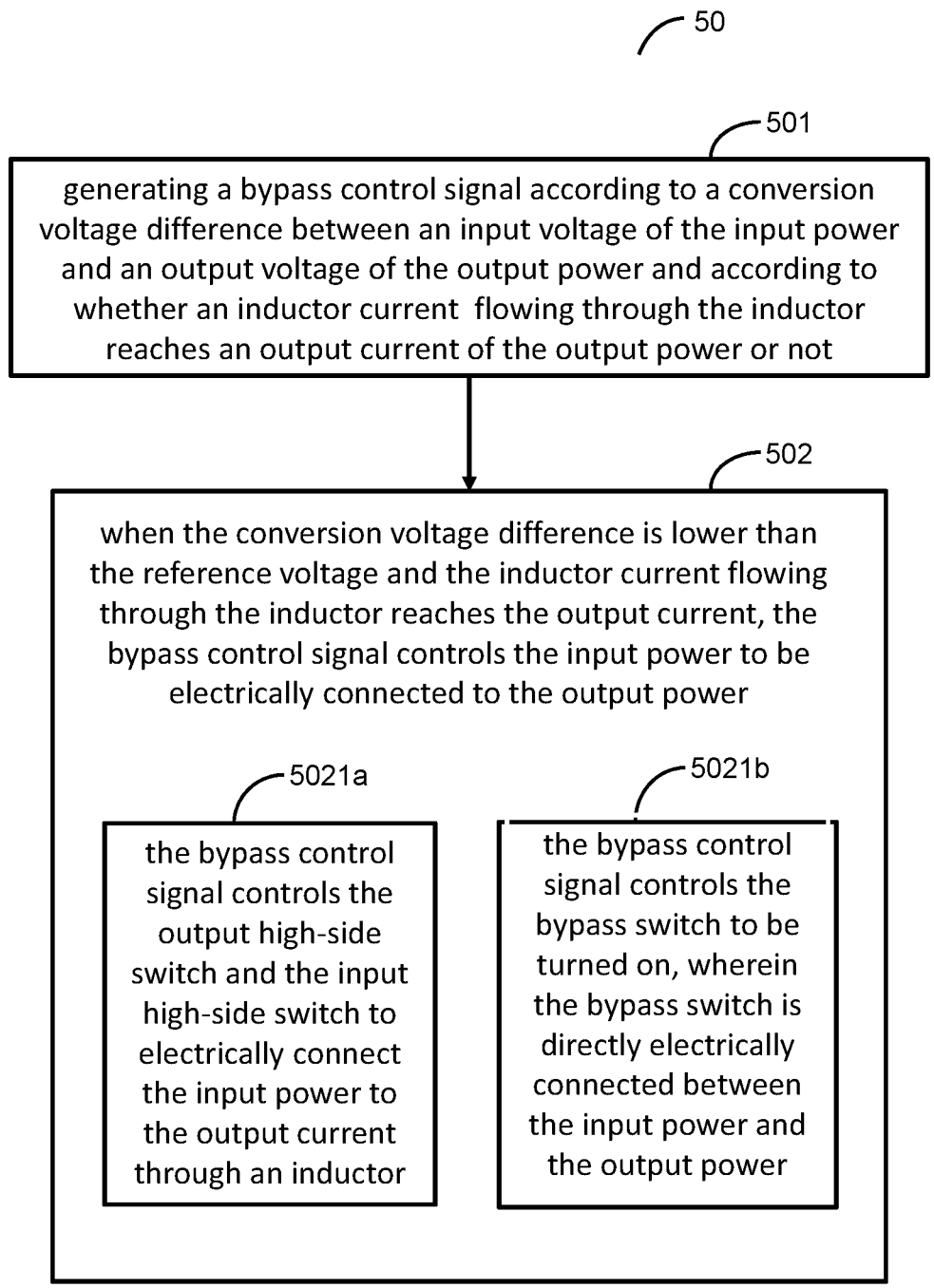
FIG. 8 shows a control method of a buck-boost switching regulator according to yet another embodiment of the present invention.

FIG. 8 shows a control method of a buck-boost switching regulator according to yet another embodiment of the present invention. The control method 50 of the buck-boost switching regulator of the present invention includes: step 501, generating a bypass control signal VE according to a conversion voltage difference between an input voltage VIN of the input power and an output voltage VOUT of the output power and according to whether an inductor current IL flowing through the inductor L reaches an output current IOUT of the output power or not. Subsequently, in step 502, when the conversion voltage difference is lower than the reference voltage and the inductor current IL flowing through the inductor L reaches the output current IOUT, the bypass control signal VE controls the input power to be electrically connected to the output power. The step 502 can include step 5021a or step 5021b, as two specific embodiments. In step 5021a, when the conversion voltage difference is less than the reference voltage and the inductor current IL flowing through the inductor L reaches the output current IOUT, the bypass control signal VE controls the output high-side switch D and the input high-side switch A to electrically connect the input power to the output current IOUT through an inductor L. In step 5021b, when the conversion voltage difference is less than the reference voltage and the inductor current IL flowing through the inductor L reaches the output current IOUT, the bypass control signal VE controls the bypass switch E to be turned on, wherein the bypass switch E is directly electrically connected between the input power and the output power.

Figure 9:
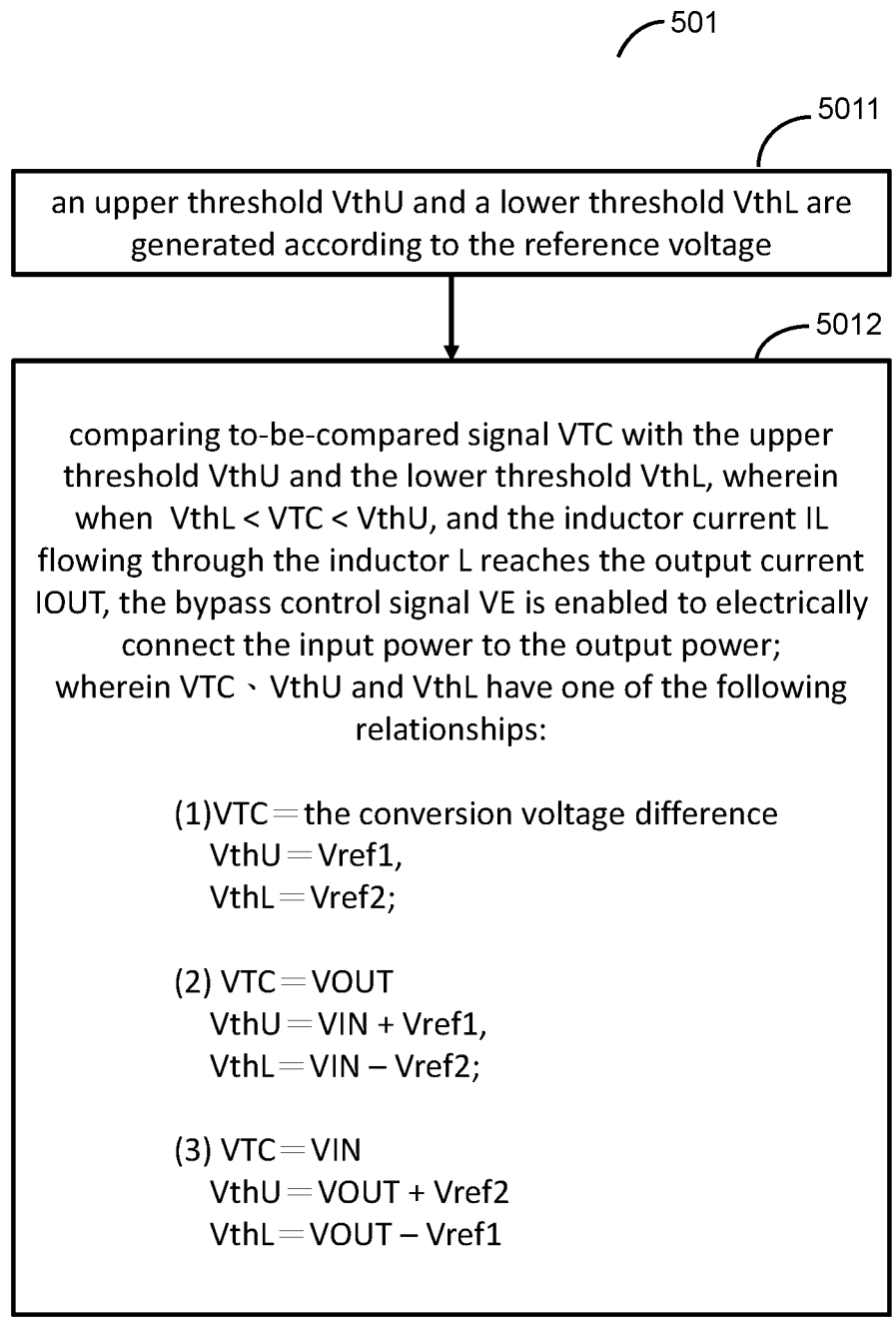
FIG. 9 shows a control method of a buck-boost switching regulator according to yet another embodiment of the present invention.

FIG. 9 shows a control method of a buck-boost switching regulator according to yet another embodiment of the present invention. In one embodiment, the step 501 can include step 5011 and step 5012. In the step 5011, an upper threshold VthU and a lower threshold VthL are generated according to the reference voltage. In the step 5012, a to-be-compared signal VTC is compared with the upper threshold VthU and the lower threshold VthL. When the to-be-compared signal VTC ranges between the upper threshold VthU and the lower threshold VthL and the inductor current IL flowing through the inductor L reaches the output current IOUT, the bypass control signal VE is enabled to electrically connect the input power to the output power, wherein the to-be-compared signal VTC, the upper threshold VthU, and the lower threshold VthL have one of the following relationships: (1) the to-be-compared signal VTC is the conversion voltage difference, and the upper threshold VthU is the first reference voltage Vref1, and the lower threshold VthL is the second reference voltage Vref2; (2) the to-be-compared signal VTC is the output voltage VOUT, and the upper threshold VthU is a sum of the input voltage VIN and the first reference voltage Vref1, and the lower threshold VthL is a difference between the input voltage VIN and the second reference voltage Vref2; and (3) the to-be-compared signal VTC is the input voltage VIN, and the upper threshold VthU is a sum of the output voltage VOUT and the second reference voltage Vref2, and the lower threshold VthL is a difference between the output voltage VOUT and the first reference voltage Vref1.

The present invention provides a buck-boost switching regulator and a control method thereof as described above. By switching to the bypass mode only when the inductor current reaches the output current, the present invention can achieve the effects of reducing ringing without low on-resistance bypass switch, reducing die size area, and adaptively mitigating ringing in any situation.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A buck-boost switching regulator configured to convert an input power into an output power, comprising:
    a power switch circuit, comprising an input switch unit and an output switch unit, wherein the input switch unit is configured to alternatingly connect a first end of an inductor to the input power or a ground potential, and the output switch unit is configured to alternatingly connect a second end of the inductor to the output power or the ground potential, so as to convert the input power into the output power;
    a bypass control circuit, configured to generate a bypass control signal according to a conversion voltage difference between an input voltage of the input power and an output voltage of the output power and according to whether an inductor current flowing through the inductor reaches an output current of the output power; and
    a bypass switching circuit, wherein when the conversion voltage difference is less than a reference voltage and when the inductor current flowing through the inductor reaches the output current, the bypass control signal controls the bypass switching circuit to electrically connect the input power to the output power, so that the buck-boost switching regulator operates in a bypass mode.

2. The buck-boost switching regulator of claim 1, wherein when the buck-boost switching regulator operates in a buck mode, an output high-side switch of the output switch unit is turned on, and an output low-side switch of the output switch unit is turned off, wherein when the conversion voltage difference is less than the reference voltage and when the inductor current flowing through the inductor reaches the output current, the bypass control signal controls the bypass switching circuit to electrically connect the input power to the output power, so that the buck-boost switching regulator is switched from the buck mode to the bypass mode.

3. The buck-boost switching regulator of claim 2, wherein when the buck-boost switching regulator operates in the bypass mode, and when the conversion voltage difference is not less than the reference voltage, the bypass control signal controls the bypass switching circuit to switch the buck-boost switching regulator out of the bypass mode.

4. The buck-boost switching regulator of claim 1, wherein when the buck-boost switching regulator operates in a buck-boost mode, the inductor is alternately connected in series between the input power and the ground potential or between the output power and the ground potential, wherein when the conversion voltage difference is less than the reference voltage and when the inductor current flowing through the inductor reaches the output current, the bypass control signal controls the bypass switching circuit to electrically connect the input power to the output power, so that the buck-boost switching regulator is switched from the buck-boost mode to the bypass mode.

5. The buck-boost switching regulator of claim 4, wherein when the buck-boost switching regulator operates in the bypass mode, and when the conversion voltage difference is not less than the reference voltage, the bypass control signal controls the bypass switching circuit to switch the buck-boost switching regulator out of the bypass mode.

6. The buck-boost switching regulator of claim 1, wherein when the buck-boost switching regulator operates in a boost mode, an input high-side switch of the input switch unit is turned on, and an input low-side switch of the input switch unit is turned off, wherein when the conversion voltage difference is less than the reference voltage and when the inductor current flowing through the inductor reaches the output current, the bypass control signal controls the bypass switching circuit to electrically connect the input power to the output power, so that the buck-boost switching regulator is switched from the boost mode to the bypass mode.

7. The buck-boost switching regulator of claim 6, wherein when the buck-boost switching regulator operates in the bypass mode, and when the conversion voltage difference is not less than the reference voltage, the bypass control signal controls the bypass switching circuit to switch the buck-boost switching regulator out of the bypass mode.

8. The buck-boost switching regulator of claim 1, wherein the bypass switching circuit comprises an output high-side switch of the output switch unit and an input high-side switch of the input switch unit, wherein when the conversion voltage difference is less than the reference voltage and when the inductor current flowing through the inductor reaches the output current, the bypass control circuit generates the bypass control signal to control both the output high-side switch and the input high-side switch to be turned on, so as to electrically connect the input power to the output power through the inductor.

9. The buck-boost switching regulator of claim 1, wherein the bypass switching circuit comprises a bypass switch which is directly electrically connected between the input power and the output power, wherein when the conversion voltage difference is less than the reference voltage and when the inductor current flowing through the inductor reaches the output current, the bypass control circuit generates the bypass control signal to control the bypass switch to be turned on, so as to electrically connect the input power to the output power directly.

10. The buck-boost switching regulator of claim 1, wherein the conversion voltage difference is an absolute value of a difference between the input voltage and the output voltage.

11. The buck-boost switching regulator of claim 1, wherein the reference voltage comprises a first reference voltage and a second reference voltage, wherein when a difference of the output voltage minus the input voltage is less than the first reference voltage, and when a difference of the input voltage minus the output voltage is less than the second reference voltage, and when the inductor current flowing through the inductor reaches the output current, the bypass control signal is enabled, wherein the first reference voltage and the second reference voltage have one of following relationships:
  (1) the first reference voltage is equal to the second reference voltage, and neither the first reference voltage nor the second reference voltage is zero;
  (2) the first reference voltage is equal to zero, and the second reference voltage is not zero;
  (3) the second reference voltage is equal to zero, and the first reference voltage is not zero; and
  (4) the first reference voltage is not equal to the second reference voltage, and neither the first reference voltage nor the second reference voltage is zero.

12. The buck-boost switching regulator of claim 11, wherein the bypass control circuit comprises:
  a threshold control circuit configured to generate an upper threshold and a lower threshold according to the reference voltage; and
  a comparison circuit configured to compare a to-be-compared signal with the upper threshold and the lower threshold, wherein when the to-be-compared signal ranges between the upper threshold and the lower threshold and when the inductor current flowing through the inductor reaches the output current, the bypass control signal is enabled, so as to electrically connect the input power to the output power, wherein the to-be-compared signal, the upper threshold, and the lower threshold have one of following relationships:
  (1) the to-be-compared signal is the conversion voltage difference, and the upper threshold is the first reference voltage, and the lower threshold is the second reference voltage;
  (2) the to-be-compared signal is the output voltage, and the upper threshold is a sum of the input voltage and the first reference voltage, and the lower threshold is a difference between the input voltage and the second reference voltage; and
  (3) the to-be-compared signal is the input voltage, and the upper threshold is a sum of the output voltage and the second reference voltage, and the lower threshold is a difference between the output voltage and the first reference voltage.

13. The buck-boost switching regulator of claim 1, wherein the input switch unit comprises:
  an input high-side switch, coupled between the input power and the first end of the inductor; and
  an input low-side switch or an input low-side diode, coupled between the ground potential and the first end of the inductor;
  wherein the input high-side switch, and the input low-side or the input low-side diode switch are configured to alternatingly connect the first end of the inductor to the input power or the ground potential.

14. The buck-boost switching regulator of claim 1, wherein the output switch unit comprises:

an output low-side switch, coupled between the ground potential and the second end of the inductor; and an output high-side switch, coupled between the output power and the second end of the inductor;

wherein the output low-side switch and the output high-side switch are configured to alternatingly connect the second end of the inductor to the output power or the ground potential.

15. A control method of controlling a buck-boost switching regulator to convert an input power into an output power, the buck-boost switching regulator comprising a power switching circuit, and the power switching circuit comprising an input switch unit and an output switch unit, wherein the input switch unit is configured to alternatingly connect a first end of an inductor to the input power or a ground potential, and the output switch unit is configured to alternatingly connect a second end of the inductor to the output power or the ground potential, so as to convert the input power into the output power, wherein the control method comprises:

generating a bypass control signal according to a conversion voltage difference between an input voltage of the input power and an output voltage of the output power and according to whether an inductor current flowing through the inductor reaches an output current of the output power; and when the conversion voltage difference is less than a reference voltage and when the inductor current flowing through the inductor reaches the output current, the bypass control signal controlling the input power to be electrically connected to the output power, so that the buck-boost switching regulator operates in a bypass mode.

16. The control method of claim 15, wherein when the buck-boost switching regulator operates in a buck mode, an output high-side switch of the output switch unit is turned on, and an output low-side switch of the output switch unit is turned off, wherein when the conversion voltage difference is less than the reference voltage and when the inductor current flowing through the inductor reaches the output current, the bypass control signal controls the input power to be electrically connected to the output power, so that the buck-boost switching regulator is switched from the buck mode to the bypass mode.

17. The control method of claim 16, wherein when the buck-boost switching regulator operates in the bypass mode, and when the conversion voltage difference is not less than the reference voltage, the bypass control signal controls the buck-boost switching regulator out of the bypass mode.

18. The control method of claim 15, wherein when the buck-boost switching regulator operates in a buck-boost mode, the inductor is alternately connected in series between the input power and the ground potential or between the output power and the ground potential, wherein when the conversion voltage difference is less than the reference voltage and when the inductor current flowing through the inductor reaches the output current, the bypass control signal controls the input power to be electrically connected to the output power, so that the buck-boost switching regulator is switched from the buck-boost mode to the bypass mode.

19. The control method of claim 18, wherein when the buck-boost switching regulator operates in the bypass mode, and when the conversion voltage difference is not less than the reference voltage, the bypass control signal controls the buck-boost switching regulator out of the bypass mode.

20. The control method of claim 15, wherein when the buck-boost switching regulator operates in a boost mode, an input high-side switch of the input switch unit is turned on, and an input low-side switch of the input switch unit is turned off, wherein when the conversion voltage difference is less than the reference voltage and when the inductor current flowing through the inductor reaches the output current, the bypass control signal controls the input power to be electrically connected to the output power, so that the buck-boost switching regulator is switched to the bypass mode.

21. The control method of claim 20, wherein when the buck-boost switching regulator operates in the bypass mode, and when the conversion voltage difference is not less than the reference voltage, the bypass control signal controls the buck-boost switching regulator out of the bypass mode.

22. The control method of claim 15, wherein when the conversion voltage difference is less than the reference voltage and when the inductor current flowing through the inductor reaches the output current, the bypass control signal controls both an output high-side switch and an input high-side switch to be turned on, so as to electrically connect the input power to the output power through the inductor.

23. The control method of claim 15, wherein when the conversion voltage difference is less than the reference voltage and when the inductor current flowing through the inductor reaches the output current, the bypass control signal controls the bypass switch to be turned on, so as to electrically connect the input power to the output power directly, wherein the bypass switch is directly electrically connected between the input power and the output power.

24. The control method of claim 15, wherein the conversion voltage difference is an absolute value of a difference between the input voltage and the output voltage.

25. The control method of claim 15, wherein the reference voltage comprises a first reference voltage and a second reference voltage, wherein when a difference of the output voltage minus the input voltage is less than the first reference voltage, and when a difference of the input voltage minus the output voltage is less than the second reference voltage, and when the inductor current flowing through the inductor reaches the output current, the bypass control signal is enabled, wherein the first reference voltage and the second reference voltage have one of following relationships:

(1) the first reference voltage is equal to the second reference voltage, and neither the first reference voltage nor the second reference voltage is zero;

(2) the first reference voltage is equal to zero, and the second reference voltage is not zero;

(3) the second reference voltage is equal to zero, and the first reference voltage is not zero; and (4) the first reference voltage is not equal to the second reference voltage, and neither the first reference voltage nor the second reference voltage is zero.

26. The control method of claim 25, wherein the step of generating the bypass control signal comprises:

generating an upper threshold and a lower threshold according to the reference voltage; and comparing a to-be-compared signal with the upper threshold and the lower threshold, wherein when the to-be-compared signal ranges between the upper threshold and the lower threshold and when the inductor current flowing through the inductor reaches the output current, the bypass control signal is enabled, so as to electrically connect the input power to the output power, wherein the to-be-compared signal, the upper threshold, and the lower threshold have one of following relationships:

(1) the to-be-compared signal is the conversion voltage difference, and the upper threshold is the first reference voltage, and the lower threshold is the second reference voltage;
(2) the to-be-compared signal is the output voltage, and the upper threshold is a sum of the input voltage and the first reference voltage, and the lower threshold is a difference between the input voltage and the second reference voltage; and
(3) the to-be-compared signal is the input voltage, and the upper threshold is a sum of the output voltage and the second reference voltage, and the lower threshold is a difference between the output voltage and the first reference voltage.

\* \* \* \* \*